T. E. SMOOT.
GARDEN-PLOWS.
No. 194,007. Patented Aug. 7, 1877.
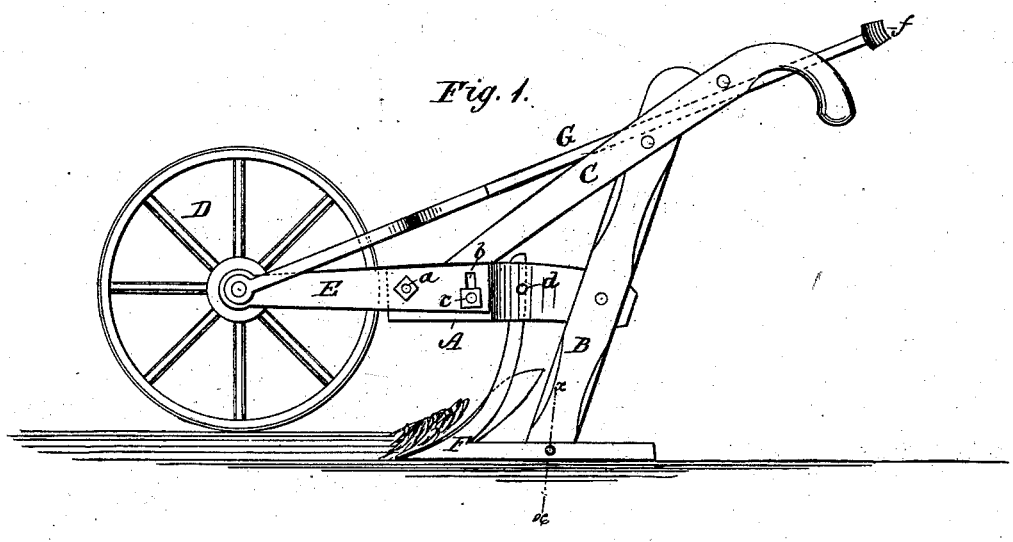
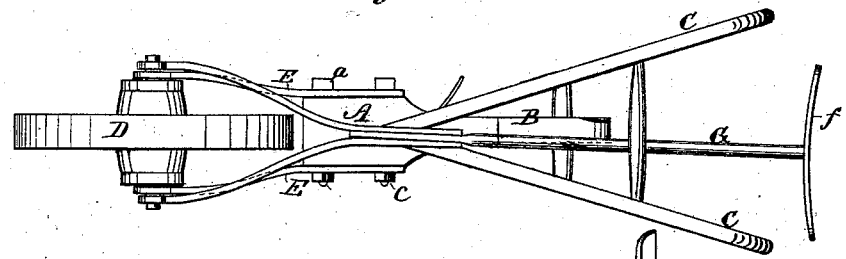
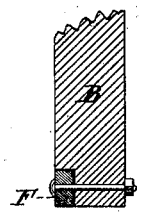
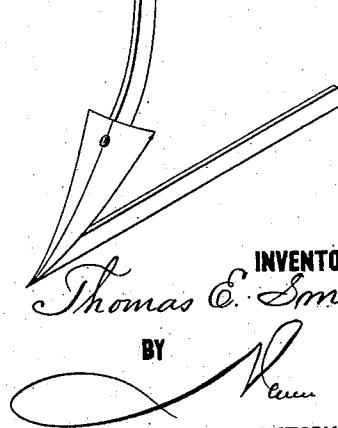
WITNESSES:
W. W. Hollingsworth
Solon C. Kemon
INVENTOR:
Thomas E. Smoot
BY
ATTORNEYS.

UNITED STATES PATENT OFFICE.

THOMAS E. SMOOT, OF FLORENCE, ALABAMA, ASSIGNOR OF ONE-THIRD HIS RIGHT TO A. M. PARKHILL, OF SAME PLACE.

IMPROVEMENT IN GARDEN-PLOWS.

Specification forming part of Letters Patent No. 194,007, dated August 7, 1877; application filed May 24, 1877.

*To all whom it may concern:*

Be it known that I, THOMAS E. SMOOT, of Florence, in the county of Lauderdale and State of Alabama, have invented a new and Improved Garden-Plow; and I do hereby declare that the following is a full, clear, and exact description of the same, reference being had to the accompanying drawings, form-part of this specification, in which—

Figure 1 is a side elevation, and Fig. 2 a plan view; Fig. 3, an enlarged sectional detail through line $x\ x$ of Fig. 1; Fig. 4, a detail perspective of a modification of plan.

My invention is an improved garden-plow, designed to be used without a team, and to be operated by being pushed in advance of the workman.

It consists in combining a push-bar with a shortened beam, a front bearing-wheel, and the opener or cultivating-shovel in such a manner that said push-bar may be employed either to push or urge forward the plow from the rear, or be thrown over on its pivots to a position in front in which it may be used as a draft attachment, as hereinafter more fully described.

In the drawing, A represents the shortened beam or block, to the rear of which is attached the stock B, which is extended upwardly, so as to form a support for the handles C, which latter are fastened at their front ends to the upper portion of the shortened beam.

D is a wheel, which is journaled in bearings in two metallic bars, E E, upon opposite sides of the wheel, which bars take the place of the ordinary clevis, but differ therefrom in being separate and independent and sufficiently extended as to receive one-half the diameter of the wheel D. These bars E are pivoted to the thickened portion of the shortened beam or block A at the point $a$, and farther to the rear have transverse slots $b$, through which passes a second bolt, $c$, which secures the bars to the block or beam in such manner as to permit an adjustment of the bars, and the elevation or depression of the wheel to cause the plow to run more or less deep into the soil.

F is the plow, which consists of a curved and nearly vertical standard and a horizontal land-side bar. The vertical standard passes through a hole in the shortened beam or block, and is secured by a bolt, $d$, that passes through a perforation in the standard, while the land-side bar fits up against a rabbet or groove (see Fig. 3) in the bottom end of the plow-stock, and is similarly secured thereto by a bolt passing through the same.

The plow, as so far described, is provided with either a mold-board, as shown in Fig. 1, or a bull-tongue opener, as in Fig. 4, the said mold-board or opener being attached to the plow either by means of bolts or permanently attached, as desired. When it is so permanently attached, the arrangement of the plow in the plow-frame permits the ready removal of one plow and the insertion of another, as the vertical bar or standard passes readily through the block or beam endwise, while the land-side bar moves at the same time laterally into its position in the groove or rabbet in the bottom end of the stock.

G is the push-bar, which consists of a rod forked at its lower front end, and having eyes in the extremities of the branches which encompass the protruding ends of the axle of the wheel D, while its rear extension passes between the rounds of the plow-frame and terminates in a curved breast-piece, $f$.

In making use of my improved garden-plow, the workman grasps the handles, and by means of bodily pressure applied through the breast-piece pushes the plow before him with the front wheel resting upon the ground, the depth of the furrow being regulated by the adjustment of the wheel and its bars, and the plow being steadied by the handles.

It will be seen that the front wheel not only serves to regulate the depth of the plow, but, when there is no draft in front of the same, it operates as a fulcrum close to the weight of the plow, upon which fulcrum the plow may be lifted by the workman to free it from grass, &c., and upon which it may be transported at the end of the row to avoid disfiguring the adjacent beds or borders.

As shown, the push-bar is arranged between the rounds of the plow-frame; but it is also to be arranged to rest upon the top round, and when in this position it may be either used as a push-bar or be thrown over on its pivots to a position in front of the wheel to constitute a draft attachment.

Having thus described my invention, what I claim as new is—

The combination, with a garden-plow having a front wheel, D, beam A and handles C, of a reversible push or draft bar, G, having breast-piece $f$, and forked lower end pivoted directly to the axle of said wheel upon opposite sides of the same, as and for the purpose set forth.

THOMAS E. SMOOT.

Witnesses:
R. J. WATERS,
H. F. BLALOCK.